United States Patent [19]

Desjardins et al.

[11] Patent Number: 5,415,525
[45] Date of Patent: May 16, 1995

[54] DUCTED TAIL ROTOR PROVIDING TORQUE REACTION AND YAW ATTITUDE CONTROL

[75] Inventors: Rene A. Desjardins, Newtown Square; Francis H. McArdle, Norristown, both of Pa.

[73] Assignee: The Boeing Company, Seattle, Wash.

[21] Appl. No.: 118,685

[22] Filed: Sep. 10, 1993

Related U.S. Application Data

[63] Continuation of Ser. No. 35,893, Mar. 23, 1993, abandoned, which is a continuation of Ser. No. 739,464, Aug. 2, 1991, abandoned.

[51] Int. Cl.$^6$ ............................................. B64C 27/78
[52] U.S. Cl. ................................ 416/168 R; 416/164; 416/245 R; 416/244 R
[58] Field of Search ............... 416/120, 123, 130, 159, 416/163, 164, 168 R, 204 R, 210 R, 244 R, 244 C, 244 D, 245 R

[56] References Cited

U.S. PATENT DOCUMENTS

| | | | |
|---|---|---|---|
| 1,203,557 | 10/1916 | Gallaudet | 416/163 |
| 2,499,314 | 2/1950 | Hunt | 416/163 |
| 3,450,208 | 6/1969 | Barton | 416/130 |
| 3,518,025 | 6/1970 | Schmidt et al. | 416/134 A |
| 3,610,774 | 10/1971 | Mouille | 416/244 |
| 3,637,321 | 1/1972 | Nekrasov et al. | 416/168 R |
| 3,768,334 | 10/1973 | Ditlinger | |
| 4,281,966 | 8/1981 | Duret et al. | 416/168 R |
| 4,545,733 | 10/1985 | Schwarz et al. | 416/168 R |
| 4,585,391 | 4/1986 | Vuillet et al. | 416/123 |
| 4,626,173 | 12/1986 | Mouille et al. | 416/168 R |
| 5,096,381 | 3/1992 | Svenning | 416/135 |

FOREIGN PATENT DOCUMENTS

| | | |
|---|---|---|
| 0212724 | 3/1987 | European Pat. Off. |
| 1593008 | 7/1970 | France |
| 2427251 | 12/1979 | France |
| 2148818 | 6/1985 | United Kingdom ............... 416/123 |
| 2148819 | 6/1985 | United Kingdom ............... 416/123 |

OTHER PUBLICATIONS

International Search Report/PCT/US92/06444/Jul. 31, 1992.

*Primary Examiner*—Edward K. Look
*Assistant Examiner*—James A. Larson
*Attorney, Agent, or Firm*—Jones, Tullar & Cooper

[57] ABSTRACT

A tail rotor for a rotary wing aircraft is located in a laterally directed duct located at the end of a tail cone extending rearward from the aircraft cabin and at the base of an empennage extending upward from the duct. The rotor includes a rotor shaft driveably connected to a power source, a rotor hub connected to the rotor shaft, a rotating control shaft, a stationary control shaft, and an actuator connected to the stationary control shaft for moving the rotating control shaft axially. The rotor hub includes rotor arms each supporting a pitch shaft for pivotable movement about a pitch axis. Each pitch shaft is adapted to support a rotor blade so that its angle of attack changes with movement of the pitch shafts. A pitch beam, located adjacent the rotor hub, supports flexure members, each connected to a pitch shaft eccentric of its pitch axis. The flexures driveably connect the pitch shafts to the pitch beam and transmit pitch control motion to the pitch shafts as the pitch beam moves along the rotor axis due to actuator input.

13 Claims, 5 Drawing Sheets

DUCTED TAIL ROTOR PROVIDING TORQUE REACTION AND YAW ATTITUDE CONTROL

This is a continuation of application Ser. No. 08/035,893 filed on Mar. 23, 1993, abandoned, which is a continuation of application, Ser. No. 07/739,464, filed Aug. 2, 1991, abandoned.

CROSS-REFERENCE TO RELATED APPLICATIONS

This application discloses subject matter in common with applications, Ser. No. 07/739,499 and 07/739,498.

BACKGROUND OF THE INVENTION

1. Field of the Invention

This invention relates to the field of helicopter tail rotors that produce aerodynamic thrust of variable magnitude to alter and stabilize the yaw position of the aircraft. More particularly, it pertains to pitch control actuation for such rotors enclosed within an aerodynamic control member forming a duct directed laterally with respect to the longitudinal aircraft axis.

2. Description of the Prior Art

A single rotor helicopter must have some means of compensating for main rotor torque. With a main rotor rotating counterclockwise, main rotor torque will cause the nose of the aircraft to turn opposite the direction of rotation, i.e. to the right. This condition is compensated by aerodynamic thrust produced by a tail rotor directed to the right producing a clockwise moment equal to main rotor torque. However, main rotor torque varies according to the magnitude of power applied to the main rotor; therefore, tail rotor thrust must vary to stabilize the yaw position and attitude of the aircraft as main rotor power changes.

The tail rotor is used also to control movement of the helicopter about its vertical axis. By overcompensating for main rotor torque, the nose turns leftward; by undercompensating, the nose turns rightward. Changing tail rotor thrust alters the magnitude of the yaw moment it applies to the fuselage so that the angular position of the aircraft with respect to the vertical axis is changed in accordance with control system input.

During operation in hover conditions and when flight speed is low, the helicopter is particularly susceptible to laterally directed wind gusts. This susceptibility requires frequent, precise corrective yaw control by the pilot to adjust tail rotor thrust.

The magnitude of tail rotor thrust varies with changes in the pitch or angle of attack of the tail rotor blades. Pitch links, or pitch control rods, connected to each pitch arm of the tail rotor hub at a position offset from the corresponding pitch axis, are raised and lowered concurrently, i.e. collectively, in accordance with control input to adjust blade pitch and tail rotor thrust as required to alter and stabilize the yaw position of the aircraft.

Conventional helicopter tail rotors are controlled manually by the pilot who manipulates pitch control pedals located in the cockpit. The pedals are connected by cables, bellcranks and push-pull rods to the collective pitch controls at the tail rotor. The tail rotor control system changes the angle of attack of the tail rotor blades and, in that way, the magnitude of the thrust force produced by the rotor. The thrust force produced by the tail rotor, directed laterally and located distant from the center of gravity of the aircraft, produces on the aircraft a yaw moment that continually reacts and compensates main rotor torque to maintain yaw position stability.

U.S. Pat. No. 4,809,931 describes a helicopter tail rotor enclosed within a circular duct located at the rear of a fuselage where a "V" empennage comprising two aerodynamic surfaces meets a tail cone extending from the cabin toward the tail. The rotor is mounted so that a component of thrust in the transverse direction produces a moment opposing drive torque of the main rotor and a component of thrust in the vertical axis produces positive lift. The two control surfaces of the empennage produce aerodynamic forces directed downward, one of the control surfaces producing a force having a horizontal component.

U.S. Pat. No. 4,585,391 describes a multiple blade tail rotor located in a duct directed transverse to the aircraft longitudinal axis. Fixed radially-directed blades, located inside the duct downstream from the rotor, recover energy of rotation from the airstream at the outlet of the rotor, thereby increasing thrust produced by the rotor.

German Patentschrift DE 29 26 180 C2 describes a rotor having blades grouped in radially opposite pairs, one blade of each pair extending radially from the rotor center, the spar or main structural member of each blade pair extending continuous across the rotor axis and formed integrally with the spar of the other blade of the pair. The spar is slotted so that the rotor axis is straddled by leading and trailing spar members. The slotted portion of the spar is long so that torsional displacement of the blade occurs over great length and at minimal stress in the spar.

Tail rotor control systems in the prior art operate to manipulate pitch links connected to each pitch arm and to a rotating control ring, which is raised and lowered along the rotor axis. As the control ring moves axially, the connection of the pitch links to the corresponding pitch arm causes each blade to rotate about its pitch axis, thereby changing the angle of attack and thrust produced by the rotor. A drive scissors is required to prevent rotation of an displaceable, non-rotating stationary control ring, which supports the rotating ring.

Ideally, the weight of tail rotors and their associated control systems should be light because they are located a considerable distance from the center of lift of the main rotor. This weight and its location are partially compensated in the prior art (as described in U.S. Pat. No. 4,809,931) by inclining the rotor slightly so that tail rotor thrust has a vertical, upward component.

Conventional tail rotors and their actuation and control systems are susceptible to shortened service life due to the inherent cyclic loading to which they are subjected and the adverse effect of this load environment on the metal components comprising these systems. Substantial care must be taken to prevent fretting of mating components, surface scratches and gouges and other such conditions having potential to reduce the fatigue life of the components. Due to the cyclic nature of the load environment, the service life of pitch bearings that support the blades and pitch shafts on each rotor arm must be kept at reasonable length to minimizes the operating cost of periodic replacement.

SUMMARY OF THE INVENTION

It is an object of the present invention to overcome the problems in the prior art by providing a tail rotor having fewer blades than normally used to produce equivalent thrust. A rotor according to this invention includes eight blades compared to eleven blades that might have been required using a conventional rotor drive and control technique in the prior art.

It is an object of this invention to eliminate pitch links for transmitting axial displacement of a rotating control ring and converting that axial displacement to pitch displacement of the blades supported on each pitch shaft. Instead, a unique assembly including a pitch beam and flexure extending from the pitch beam to each pitch shaft converts axial movement to pitch displacement. Additionally, the drive scissors, rotating control ring, stationary ring, and bearing, which mutually supports the ring for relative rotation, are not required in the rotor system of this invention as they are in a conventional tail rotor system.

The tail rotor of this invention is suitable for use in a laterally directed duct surrounding the rotor, the duct located at the end of a tail cone near the base of an empennage extending upward from the duct. The rotor includes a rotor shaft driveably connected to a power source, a rotor hub driveably connected to the rotor shaft, a rotating control shaft, a stationary control shaft, and an actuator for moving the rotating control shaft axially along the rotor shaft.

The rotor hub includes rotor arms, each supporting a pitch shaft for pivotable movement about a pitch axis. Each pitch shaft is adapted to support a rotor blade whose angle of attack changes with movement of the pitch shafts. A pitch beam, located adjacent the rotor hub, supports flexure members, each connected to a pitch shaft eccentric of its pitch axis. The flexures driveably connect the pitch shafts to the pitch beam and transmit pitch control motion to the pitch shafts as the beam moves along the rotor axis due to actuator input.

The rotating control shaft and stationary control shaft are supported mutually for relative rotation by bearings that transmit axial movement of the control actuator from the stationary shaft to the rotating shaft. A shaft guide, bearing lock tube, and bearing nut hold the bearings in contact with shoulders on the concentric, rotating and stationary control shafts.

DESCRIPTION OF THE PREFERRED EMBODIMENT

Figure 1:
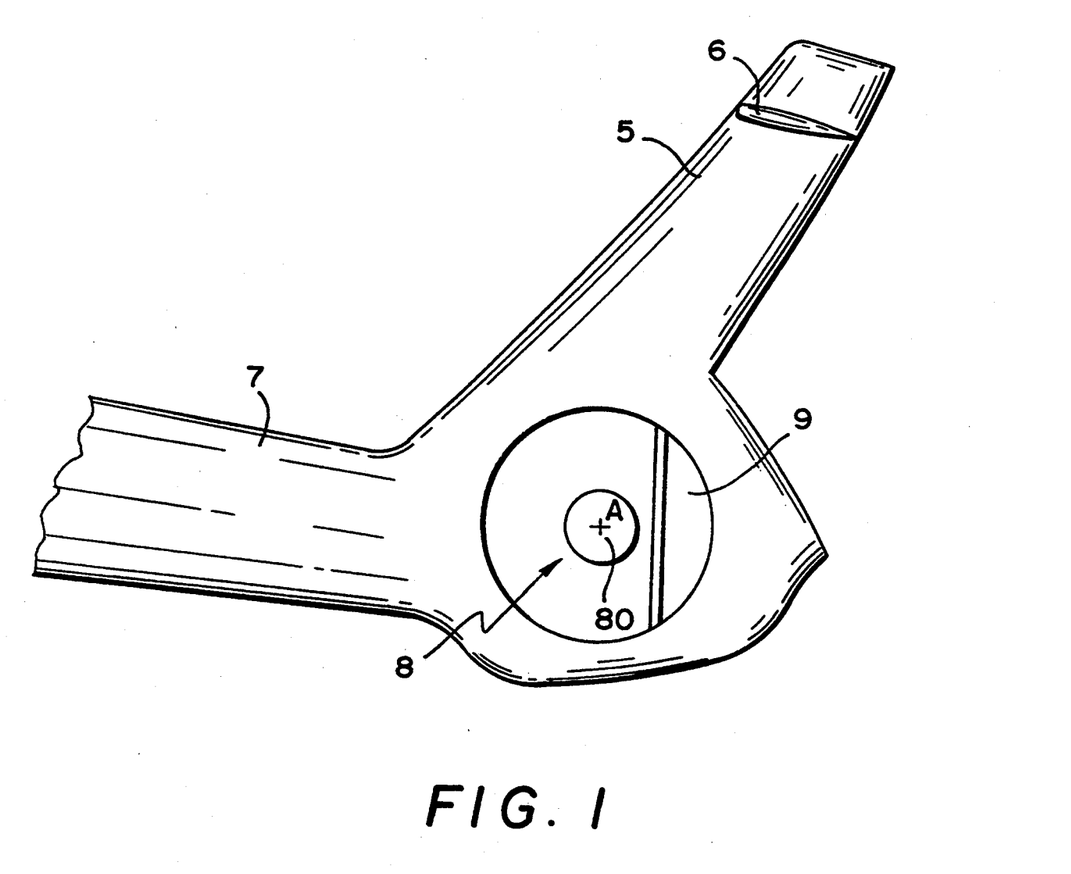
FIG. 1 is a schematic diagram in elevation showing the rear portion of a helicopter tail cone, empennage, stabilizer and ducted tail rotor.

Referring first to the schematic diagram of FIG. 1, the tail assembly or empennage 5 of a helicopter supports a horizontal stabilizer 6 at its upper end and is connected at its base to the rear of a tail cone 7 extending rearward from a cabin. A tail rotor 8, supported in a laterally directed duct 9 located between the empennage and the tail cone, produces a variable laterally directed thrust force by rotating pitched blades through an airstream in the duct.

Figure 2:
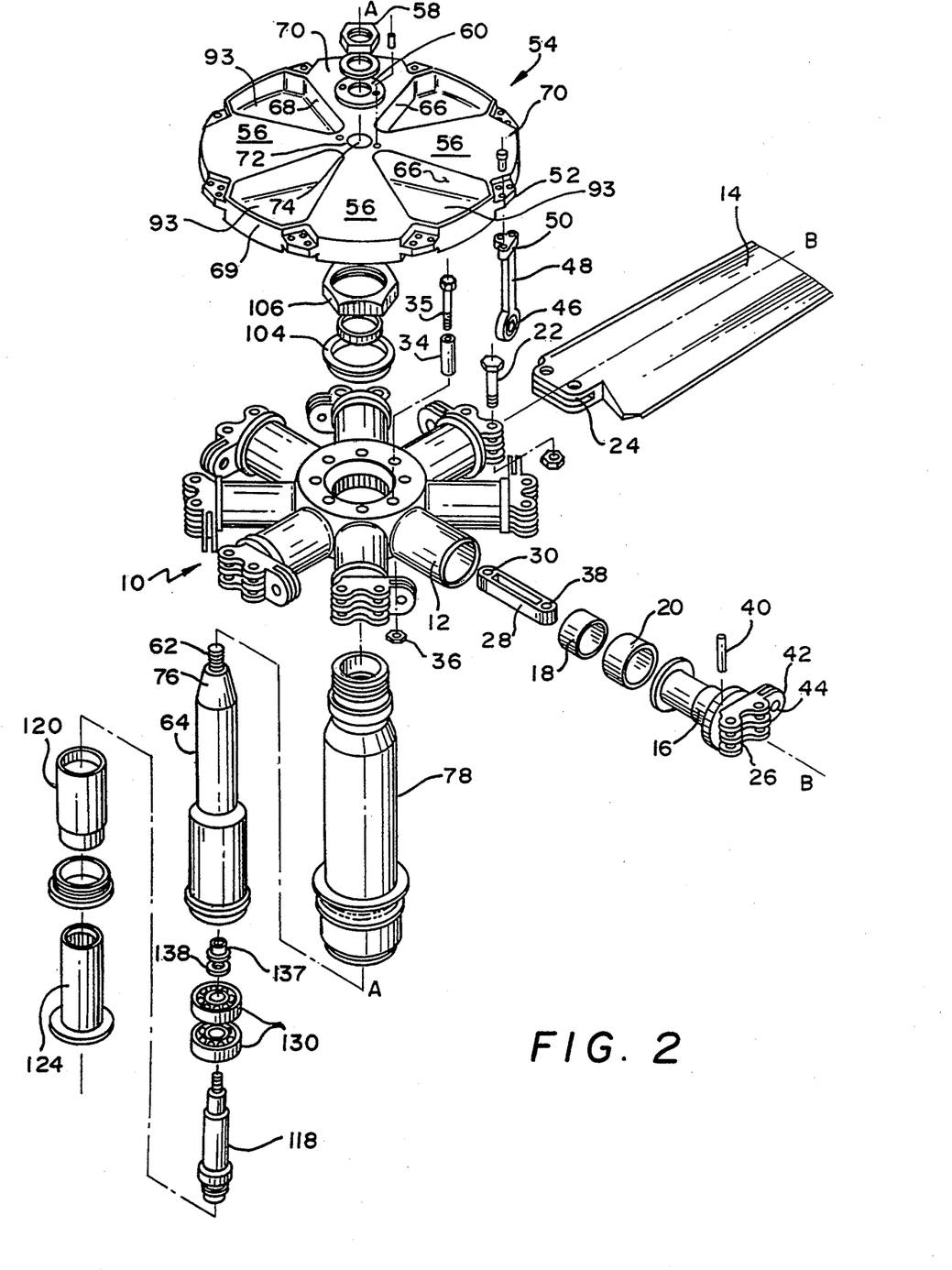
FIG. 2 is an isometric view of the rotor hub, blades and upper controls of a tail rotor assembly according to this invention, showing the components spaced apart mutually to emphasize the order of assembly and their positional relation.

The axis of rotation A—A of the tail rotor assembly of FIG. 2 is rotated approximately ninety degrees counterclockwise with reference to its operating position, so that the blades appear in a horizontal plane rather than in the substantially vertical plane in which they operate. The assembly includes a rotor hub 10 having eight angularly spaced rotor arms 12 extending outward from the axis and inclined approximately two degrees with respect to a plane perpendicular to axis A—A so that the pitch axis B of each rotor arm 12 is inclined to form a shallow conic angle with the rotor axis. Each rotor blade 14 is supported on a rotor arm extending radially from the rotor hub.

Each rotor hub arm rotatably supports a pitch shaft 16 for pitch displacement about axis B on inboard and outboard dry bearings 18, 20 located between the inner surface of the rotor hub arm and the outer surface of the pitch shaft. A rotor blade is attached to each pitch shaft by blade retention bolts 22, which pass through lugs 24 at the inner end of the blades and lugs 26 at the outer end of the pitch shaft.

One tie bar 28, is located within each rotor hub arm, and include inner lugs 30 connected to the rotor hub by an inboard tie bar pin between "and" and "nut" and a nut 36, and outboard lugs 38 connected to the pitch shaft by an outboard tie bar pin 40. The tie bars are made from thin steel wire having a diameter of approximately 0.030 inch. wound repeatedly around pins 34 and 40 to form an elongated spool, encased in urethane or epoxy, encircling pins. Alternatively, the tie bars may be made from high strength steel laminates stacked face-to-face to form an assembled thickness of such plates. A suitable tie bar assembly is available from Lord Corporation, Erie, Pennsylvania.

The tie bar 28 provides axial force and torsional continuity between the hub 10 and pitch shaft 16, yet the tie bar readily permits torsional displacement between the hub and pitch shaft because torsional stiffness of a spool or bundle of wire in this form is inherently low.

Each pitch shaft 16 includes a lug 42 located adjacent the leading edge of the rotor blade having an attachment hole 44 offset a short distance laterally from pitch axis B and suited for mechanical attachment by a bolt to a universal joint 46 in the form of a spherical bearing or rod end carried at the end of a flexure 48. The upper or opposite end of the flexure is formed with a thick flange 50 connected by multiple bolted attachments to a corresponding mounting flange 52, supported on a pitch beam 54. Flange 50 and the universal joint 46 are connected by a relatively thin web. Preferably the flexure is made of titanium.

The pitch beam 54 includes four arms 56 extending radially from the rotor axis. The pitch beam 54 and rotating control shaft 64 are connected mutually for rotation about axis A—A and displacement along that axis by a taper-lock and key arrangement 128 located at the outboard end of control shaft 64 and secured by pitch beam nut 58 and washer 60. Located at the radial periphery of the pitch beam arms 56, at the leading and trailing sides of the arms where flanges 66, 68 terminate at ring 69, are eight mounting flanges 52, one for each rotor arm blade and flexure. Each mounting flange 52 is located at the outboard end of a radially directed web 70 extending outward from the rotor center and connecting the flanges at angularly spaced locations about the rotor axis. The pitch beam arms 56 are joined at a central hub 72 formed with a tapered hole 74, which receives the mating tapered surface 76 at the end of the rotating control shaft 64. The key arrangement 128 fixes the pitch beam 54 and rotating control shaft against relative rotation.

Preferably the pitch beam 54 is made of aluminum or fiber reinforced composite material, such as epoxy resin reinforced with graphite fibers.

Figure 3:
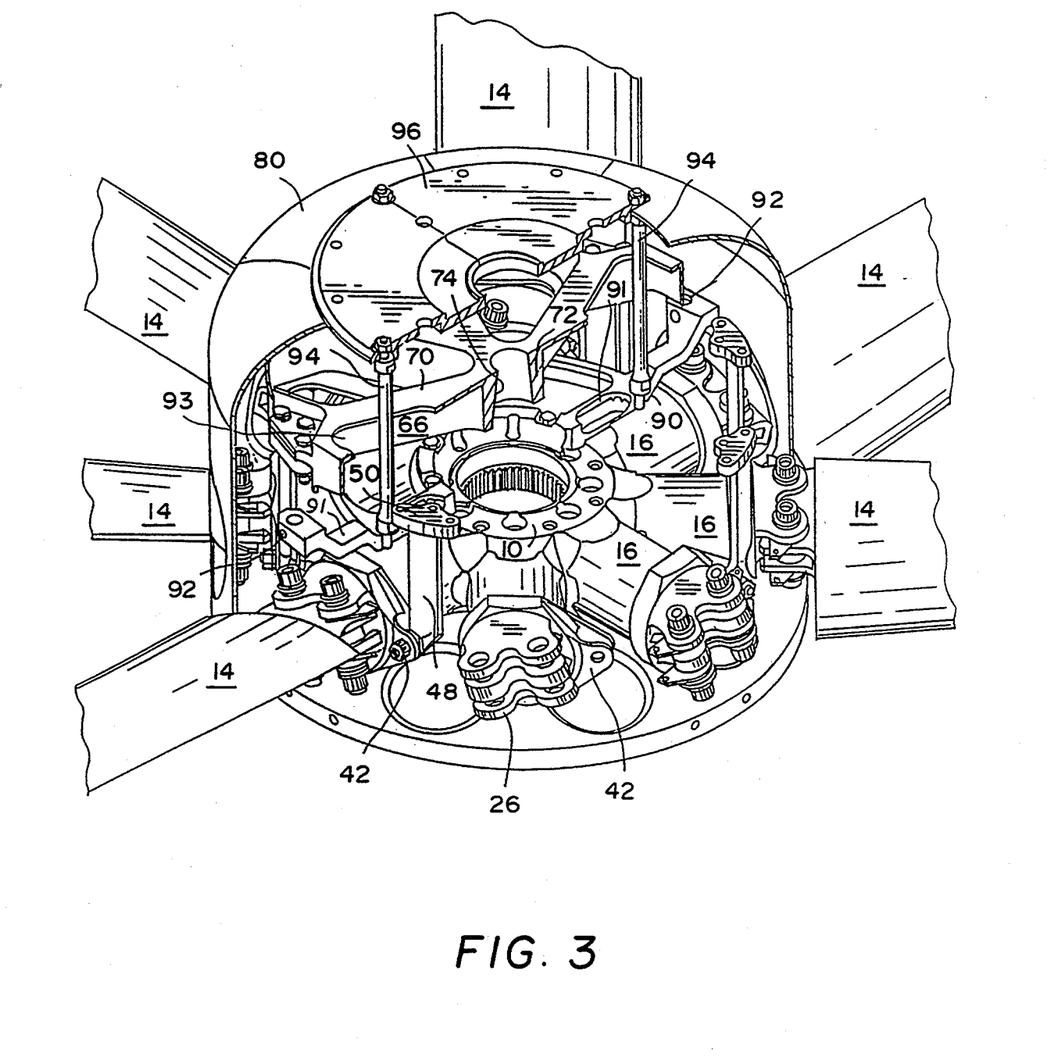
FIG. 3 is an isometric view, partially in cross section taken at a diametric plane, showing a portion of a tail rotor according to the present invention that is located within the rotor housing. A segment of the rotor and certain components are removed to show with clarity the remaining portion.
Figure 4A:
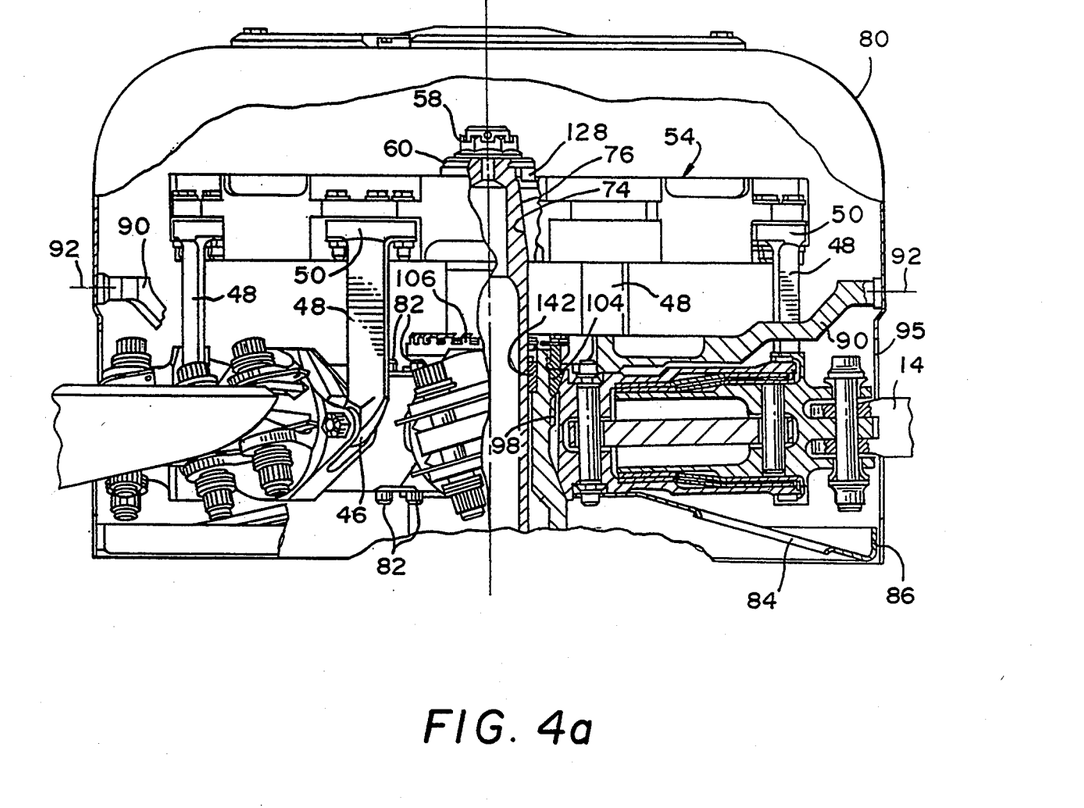
FIGS. 4a and 4b in combination are a cross section through a diametric plane of a rotor hub, upper rotor controls, lower rotor controls and associated driveline components.
Figure 4B:
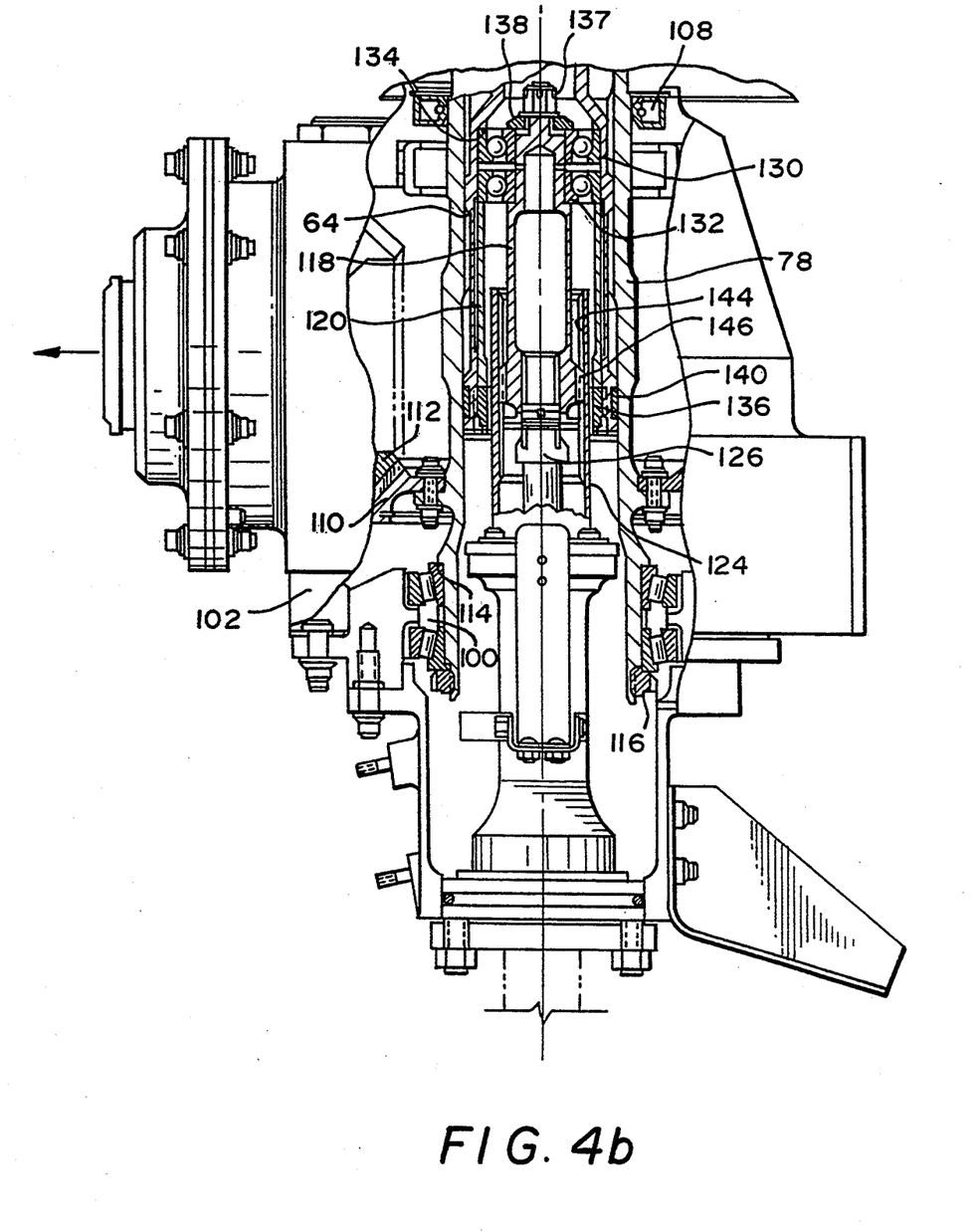

The rotor hub 10, pitch beam 54, pitch shafts 16, blade root end attachments 24, and the adjacent outboard ends of rotating control shaft 64 and a rotor shaft 78 are enclosed by a rotor housing, a rotor shell 80 supported from the inboard surface of the rotor hub at multiple bolted connections 82 angularly spaced about the rotor axis. FIGS. 3, 4a and 4b show the housing. A shell closure plate 84, connected at 86 to the edge of the rotor shell, is inclined radially inward and toward the bolt circle defined by bolted connection 82. Outboard support for the rotor shell 80 is provided by a ring 90, connected to the outer wall of the shell by attachments 92 located at the end of angularly spaced arms 91 extending inward from ring 90. Arms 91 extend radially inward to the bolt circle on the outboard surface of the rotor hub, where the bolted connection 82 join ring 90 to the hub. FIG. 3 shows bolts 94 extending outboard from ring 90 through opening 93 to a connection made with a removable cover 96, which closes the outboard surface of the rotor shell.

The rotor shell 80 is provided with openings 95 through which the root end of the rotor blades 14 pass for attachment to a respective pitch shaft.

Rotor shaft 78, which passes through an opening in rotor shell closure plate 84, is driveably connected to rotor hub 10 by a spline 98 and is supported rotatably by tandem roller thrust bearings 100 carried on a gearbox housing 102. A tapered ring 104, located between a conical surface formed on the central opening of the rotor hub and the outer surface of the rotor shaft, is fitted in position by the engagement of a castellated nut 106 contacting the tapered ring 104 and screw threads on the outboard end of the rotor shaft. A dynamic seal 108 located on the gearbox contacts the outer surface of the rotor shaft at the base of the rotor shell to prevent passage of dirt, hydraulic fluid or contaminants. A bevel gear 110, bolted to the rotor shaft, meshes with a bevel gear 112 located within the gearbox and supported rotatably on a shaft driven by an engine. The position of the tandem bearing with respect to the gearbox and rotor shaft is determined by forcing the bearing into contact with a shoulder 114 on the rotor shaft as a terminal nut 116 engages screw threads at the end of the shaft.

Located within the bore of rotor shaft 78 are the rotating control shaft 64, a stationary control shaft 118, a bearing lock tube 120, a shaft guide 124, and a push-pull actuator 126. The rotating control shaft 64 is supported rotatably with respect to the stationary control shaft 118 by tandem ball bearings 130 located between a shoulder 132 on control shaft 118 and a shoulder 134 on control shaft 64. The outer races of the ball bearings are held in contact with shoulder 134 by the end of the bearing lock tube 120, which is forced against the outer races by engagement between a bearing lock nut 136 and screw threads on the inner surface of the rotating control shaft 64. The inner races of the ball bearings are held in contact with shoulder 132 by a bearing lock nut 137 and washer 138, which are forced against the inner races by engagement of nut 137 with screw threads on the outboard end of the stationary control shaft 118. A bearing 140 rotatably supports control shaft 64 with respect to the rotor shaft at the inboard end of the rotor shaft; bearing 142 supports control shaft 64 on the rotor shaft at the outboard end of the rotor shaft.

The shaft guide 124, mechanically fixed at its lower or inboard end against rotation and displacement, includes an axially directed spline 144 formed on its inner surface and extending along the length of the guide. The shaft guide spline is engaged with a shorter spline 146 formed on the outer surface of control shaft 118. The meshing splines prevent rotation of the stationary control shaft and guide its axial displacement within the shaft guide as actuator 126 extends and retracts in accordance with need for changes in tail rotor thrust. Actuator 126 is an hydraulic cylinder having a piston or arm connected to control shaft 118 for extension and retraction as the cylinder is pressurized and vented.

The eight angularly spaced flexures 48 rotatably connect the pitch beam 54 and rotor hub through the pitch lug connections.

In operation, the actuator 126 extends and retracts in response to pilot control or automatic control intended to alter the tail rotor thrust. When the actuator raises control shaft 118, that shaft moves axially guided by the shaft guide splines. Contact between bearings 130 and the shoulders of control shafts 64 and 118 cause the rotating shaft 78 and pitch beam to rise relative to the rotor hub and blades. This action displaces the pitch lugs upward, causes the pitch shafts to pivot about the pitch axes, increases pitch of the rotor blades, and increases thrust produced by the tail rotor.

Torque from the engine is delivered to the rotor shaft at the meshing bevel gears 110, 112. The rotor hub, pitch shaft and blades are driven from the rotor shaft through spline connection 98. The flexures 48 are driven in rotation about the rotor axis due to their connections at the pitch shafts where the universal joints 46 is located. The flexures drive the pitch beam rotatably about the rotor axis through the mechanical attachments 52 at the outboard ends of each flexure. The flexures are relatively stiff in the direction circumferential to the rotor axis and relatively flexible in a direction normal to the rotor axis, the radial direction.

It will be apparent that many modifications and variations may be effected without departing from the scope of this invention. Therefore, the appended claims cover all such modifications and variations which fall in the scope of this invention.

We claim:

1. In a tail rotor having a plurality of rotor blades, said tail rotor producing aerodynamic thrust of variable magnitude to alter and stabilize the yaw position of a rotary wing aircraft, the combination comprising:
a rotor shaft defining a rotor axis and mounted for rotation about the rotor axis;
a rotor hub driveably connected to the rotor shaft, supported for rotation about the rotor axis, said rotor hub having multiple rotor arms angularly spaced about, and extending radially outwardly from said rotor axis;
a plurality of pitch shafts, each defining a pitch axis and each rotatably supported on a respective rotor arm for movement about its pitch axis extending along the corresponding rotor arm;

a rotating control shaft mounted for rotation about the rotor axis and displacement along said rotor axis;

a pitch beam driveably connected to the rotating control shaft for rotation about the rotor axis and displacement along said rotor axis;

a plurality of flexure means each flexure means being connected to a respective pitch shaft at a location offset from the respective pitch axis and connected driveably to the pitch beam, for moving each pitch shaft about its respective pitch axis in response to axial displacement of the pitch beam, each said flexure means being relatively stiff in a direction circumferential to the rotor axis and relatively flexible in a direction normal to the rotor axis.

2. The tail rotor of claim 1 further comprising:

means connected to the rotating control shaft for displacing the rotating control shaft along the rotor axis.

3. The tail rotor of claim 2 further comprising: a stationary control shaft, and wherein the means for displacing the rotating control shaft comprises an actuator having an extendable and retractable arm driveably connected to the stationary control shaft.

4. The tail rotor of claim 1 wherein said rotating control shaft defines a first shoulder, the tail rotor further comprising:

a bearing lock tube having a first axially displaceable abutting surface facing said first shoulder and spaced axially therefrom;

a bearing lock nut for adjusting the axial position of said first axially displaceable abutting surface, said bearing lock nut having a second axially displaceable abutting surface and means for fixing the adjustable axial position of said first axially displaceable abutting surface relative to said first shoulder;

a shaft guide fixed against axial displacement and rotation, said shaft guide having an engageable surface adapted to guide displacement along the rotor axis and to prevent rotation about the rotor axis;

a stationary control shaft engaged with said engageable surface of said shaft guide, said stationary control shaft having a second shoulder facing away from said second axially adjustable abutting surface and spaced axially therefrom;

a further bearing lock nut engaged with said stationary control shaft; and bearing means having first races located between said first shoulder and said first axially displaceable abutting surface and second races located between said second shoulder and said further bearing lock nut for supporting said rotating control shaft rotatably with respect to said stationary control shaft and for axially extending and retracting said rotating control shaft relative to said stationary control shaft.

5. The tail rotor of claim 1 further comprising a plurality of tie bar means, each connecting a respective pitch shaft to the rotor hub for producing a stiff connection between the pitch shaft and the rotor hub suited to transmit force directed substantially parallel to the respective pitch axis, and a relatively flexible connection between the pitch shaft and the rotor hub suited to permit relative pitch displacement about the respective pitch axis therebetween.

6. The tail rotor of claim 5 wherein the tie bar means comprises:

first and second pins spaced mutually along each pitch axis;

spools of wire, each spool wound repeatedly to form an elongated spool or loop encircling respective first and second pins, each spool located within a corresponding hub arm, and being connected by the first pin to the corresponding pitch shaft and by the second pin to the rotor hub.

7. The tail rotor of claim 5 wherein the tie bar means comprises:

tie bars comprising multiple laminates of sheet stacked face-to-face to form an assembled thickness thereof, each tie bar located within each hub arm, and extending between a corresponding pitch shaft and the rotor hub, and having an inboard lug and an outboard lug located at opposite axial ends;

means for connecting each inboard lug to the rotor hub and for connecting each outboard lug to the corresponding pitch shaft.

8. The tail rotor of claim 5 wherein said rotating control shaft defines a first shoulder, said tail rotor further comprising:

a bearing lock tube having a first axially displaceable abutting surface facing said first shoulder and spaced axially therefrom;

a bearing lock nut for adjusting the axial position of said first axial displaceable abutting surface, said bearing lock nut having a second axially adjustable abutting surface and means for fixing the adjustable axial position of said first axially adjustable abutting surface relative to said first shoulder;

a shaft guide fixed against axial displacement and rotation, said shaft guide having an engageable surface adapted to guide displacement along the rotor axis and to prevent rotation about the rotor axis;

a stationary control shaft engaged with said engageable surface of said shaft guide, said stationary control shaft having a second shoulder facing away from said second axially adjustable abutting surface and spaced axially therefrom;

a further bearing lock nut engaged with said stationary control shaft; and bearing means having first races located between said first shoulder and said first axially displaceable abutting surface and second races located between said second shoulder and said further bearing lock nut for supporting said rotating control shaft rotatably with respect to said stationary control shaft and for axially extending and retracting the rotating control shaft relative to said stationary control shaft.

9. The tail rotor of claim 1 wherein the rotor hub defines an outboard side, and wherein the pitch beam is located at the outboard side of the rotor hub and comprises multiple attachment means radially spaced from the rotor axis, angularly spaced mutually about the rotor axis, and adapted for connection to the flexure means.

10. The tail rotor of claim 9 further comprising a rotor shell covering the pitch beam, flexure means, and rotor hub, said rotor shell having apertures mutually spaced about the rotor axis, each aperture located at the radially outer end of each pitch shaft, each aperture adapted to permit a rotor blade to extend therethrough for connection to the corresponding pitch shaft; and means supporting the rotor shell on the rotor hub for rotation with the rotor hub.

11. A tail rotor having a plurality of rotor blades, said tail rotor producing aerodynamic thrust of variable magnitude to alter and stabilize the yaw position of a rotary wing aircraft, comprising:

a rotor shaft mounted for rotation about a rotor axis;

a rotor hub driveably connected to the rotor shaft, and supported for rotation about the rotor axis, said rotor hub having multiple rotor arms angularly spaced about, and extending radially outwardly from said axis;

a plurality of pitch shafts, each defining a pitch axis and each being rotatably supported on a rotor arm for movement about its pitch axis extending along the corresponding rotor arm;

a rotating control shaft mounted for rotation about the rotor axis and displacement along said rotor axis;

a pitch beam driveably connected to the rotating control shaft for rotation about the rotor axis and displacement along said rotor axis;

a plurality of flexure means, each flexure means being connected to a respective pitch shaft at a location offset from the respective pitch axis and connected driveably to the pitch beam, for moving each pitch shaft about its respective pitch axis in response to axial displacement of the pitch beam and for driving the pitch beam rotatably about the rotor axis as the flexure means is driven by rotation of the rotor, each said flexure means being relatively stiff in the direction circumferential to the rotor axis and relatively flexible in a direction normal to the rotor axis;

a plurality of tie bar means, each connecting a respective pitch shaft to the rotor hub for producing a stiff connection between the pitch shaft and the rotor hub suited to transmit force directed substantially parallel to the respective pitch axis, and a relatively flexible connection between the pitch shaft and the rotor hub suited to permit relative pitch displacement about the respective pitch axis therebetween; and a rotor shell covering the pitch beam, flexure means, and rotor hub, said rotor shell having apertures mutually spaced about the rotor axis, each aperture located at the radially outer end of each pitch shaft, each aperture adapted to permit a rotor blade to extend therethrough for connection to the corresponding pitch shaft.

12. The rotor of claim 11 wherein said rotating control shaft defines a first shoulder, said rotor further comprising:

a bearing lock tube having a first axially displaceable abutting surface facing said first shoulder and spaced axially therefrom;

a bearing lock nut for adjusting the axial position of said first axially displaceable abutting surface, said bearing lock nut having a second axially adjustable abutting surface and means for fixing the adjustable axial position of said first axially displaceable abutting surface relative to said first shoulder;

a shaft guide fixed against axial displaceable and rotation, and shaft guide having an engageable surface adapted to guide displacement along the rotor axis and to prevent rotation about the rotor axis;

a stationary control shaft engaged with said engageable surface of said shaft guide, said stationary control shaft having a second shoulder facing away from said second axially adjustable abutting surface and spaced axially therefrom;

a further bearing lock nut engaged with said stationary control shaft; and bearing means having first races located between said first shoulder and said first axially displaceable abutting surface and second races located between said second shoulder and said further bearing lock nut for supporting said rotating control shaft rotatably with respect to said stationary control shaft and for axially extending and retracting said rotating control shaft relative to said stationary control shaft.

13. The rotor of claim 12 further comprising means supporting the rotor shell on the rotor hub for rotation with the rotor hub.

* * * * *